United States Patent Office 3,326,934
Patented June 20, 1967

3,326,934
PROCESS FOR PREPARING 1-OXO-2-SUBSTI-
TUTED - 3 - IMINO - 4,7 - DIAMINO - 5,6-
PHTHALOYLISOINDOLINES
Takashi Akamatsu, Ashiya-shi, Eiji Yamada, Takatsuki-shi, and Hiroshi Korenaga, Takarazuka-shi, Japan, assignors to Sumitomo Chemical Company, Ltd., Osaka, Japan, a corporation of Japan
No Drawing. Filed Aug. 17, 1964, Ser. No. 390,224
Claims priority, application Japan, Aug. 21, 1963, 38/44,558
2 Claims. (Cl. 260—325)

This invention relates to a process for producing anthraquinone dyestuffs, more particularly, to an improved process for producing anthraquinone dyestuffs essentially composed of 1-oxo - 2 - substituted-3-imino-4,7-diamino-5,6-phthaloylisoindoline.

The present anthraquinone dyestuffs are blue disperse dyestuffs suitably employed for dyeing various synthetic hydrophobic fibers, and can be represented by the general formula,

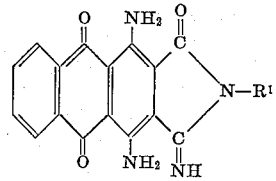

wherein $R^1$ is selected from the group consisting of saturated and unsaturated alkyl, alkoxyalkyl, cycloalkyl, aryloxyalkyl, aralkyl, aralkyloxyalkyl, hydroxyalkyl, and furfurl radicals, having 2 to 12 carbon atoms.

The process for the production of the dyestuffs having the formula of

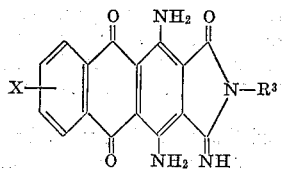

in which X represents a hydrogen atom, a chlorine atom or a bromine atom and $R^3$ represents an unsubstituted and substituted alkyl radicals, has been disclosed in British Patent No. 928,700. The process comprises heating a compound of the formula,

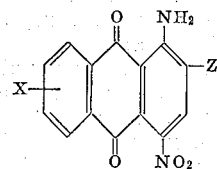

in which X has the above meaning and Z denotes a hydrogen atom, a carboxy group, a carboxylic acid amide group —$CONHR^3$ in which $R^3$ has the above meaning, a carboxylic acid ester group of an alcohol with 1 to 8 carbon atoms, a carboxylic acid halide group or a sulfonic acid group, with a water-soluble ionic cyanide, such as sodium cyanide, potassium cyanide, magnesium cyanide and calcium cyanide, in a polar diluent at 20° to 180° C. in fact, this process is exceedingly troublesome. Besides, it by-produces the dicarboximide compounds in an amount as much as about 40%, which affect deleteriously to the color shade and dyeability.

Accordingly, an object of the invention is to provide a novel process for producing anthraquinone dyestuffs essentially composed of the compound of the formula,

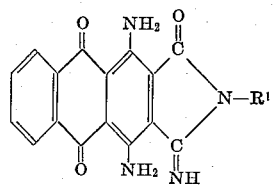

wherein $R^1$ has the same meaning as identified above, which contain little amount of the by-product and have brilliant blue shade, along with excellent dyeability to various synthetic fibers, as compared with those produced according to the conventional process. Another object is to provide a novel process for producing such anthraquinone dyestuffs, which process is extremely simple as compared with the conventional process. Other objects would be apparent from the following description.

To accomplish these objects, the invention provides a process for producing anthraquinone dyestuffs essentially composed of the compound of the formula,

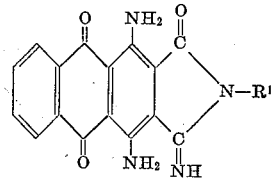

wherein $R^1$ is selected from the group consisting of saturated and unsaturated alkyl, alkoxyalkyl, cycloalkyl, aryloxyalkyl, aralkyl, aralkyloxyalkyl, hydroxyalkyl, and furfuryl radicals, having 2 to 12 carbon atoms, which process comprises treating 1-hydroxy-3-imino-4,7-diamino-5,6-phthaloylisoindolenine or its tautomer, 1-oxo-3-imino-4,7-diamino-5,6-phthaloylisoindoline, with an alkylating agent having the general formula of $R^1$—X, wherein X is selected from the group consisting of halogen atoms and $R^2$—$SO_2$—O— radicals, $R^1$ having the same meanings as identified above and $R^2$ being a member of aliphatic and aromatic residues.

In another aspect, the present invention provides a process for producing anthraquinone dyestuffs essentially composed of the compound of the formula,

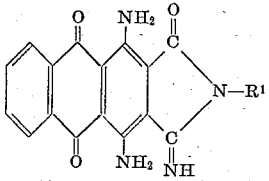

wherein $R^1$ is selected from the group consisting of saturated and unsaturated alkyl, alkoxyalkyl cycloalkyl, aryloxyalkyl, aralkyl aralkyloxyalkyl, hydroxyalkyl, and furfuryl radicals, having 2 to 12 carbon atoms, which comprises contacting 1,4-diaminoanthraquinone-2,3-dinitrile with a fuming sulfuric acid having $SO_3$ concentration of 0% to 5% at a temperature of 20° to 30° C., pouring the reaction mixture into ice and water, separating the resulting precipitate, washing the precipitate with water, treating the precipitate with an aqueous dilute alkaline solution, drying the precipitate to obtain a hydrolysis product essentially composed of 1-hydroxy-3-imino-4,7-diamino-5,6-phthaloylisoindolenine or its tautomer, 1-oxo-3-imino-4,7-diamino-5,6-phthaloylisoindoline, treating the said hydrolysis product with an alkylating agent having the general formula of $R^1$—X, wherein X is selected from the group consisting of halogen atoms and $R^2$—$SO_2$—O— radicals, $R^1$ having the same meanings as identified above and $R^2$ being a member of aliphatic and aromatic residues.

As described above, the anthraquinone dyestuffs essentially composed of the compound (I) have heretofore been produced, starting from the compound (III) through a troublesome procedure. However, the product dyestuffs contains the by-product dicarboximide compound in an amount as much as about 40%. The inventors have found that the amount of the by-product less than about 20% is desirable to secure the brilliant color shade and excellent dyeability, and that the process according to the present invention allows to yield the satisfactory result for such purpose. Besides, the present process allows to yield variety of novel disperse dyestuffs, some of which are suitably employed for dyeing polyester fibers with brilliant shade and excellent dyeability, along wtih high build-up property.

In the process of the invention, the alkylation of the isoindolenine at the 2-position using an alkylating agent having the general formula of $R^1$—X, wherein $R^1$ and X are as identified above, is essential. If a primary amine, $R^1$—$NH_2$, is employed for the alkylation, the isoindolenine alkylated at the 3-imino substituent is produced, which is inferior in the properties to the dyestuffs of the present invention.

The material to produce the present dyestuffs is 1-hydroxy-3-imino-4,7-diamino-5,6-phthaloylisoindolenine (Formula IV) or 1-oxo-3-imino-4,7-diamino-5,6-phthaloylisoindoline (Formula V)

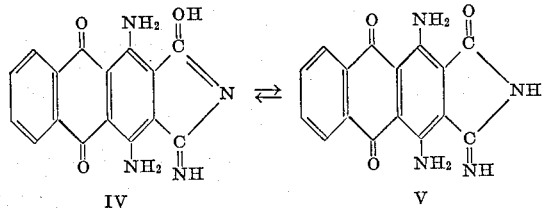

which are tautomers to each other and are to be considered essentially a single compound. For convenience, the material is called herein as the isoindolenine (IV).

It is important in the present invention that the isoindolenine (IV) is considerably pure and contains little amount of 1,4-diaminoanthraquinone-2,3-dicarboximide. Concerning the production of the isoindolenine (IV), U.S. Patent No. 2,770,625 discloses a process in which 1,4-diaminoanthraquinone-2,3-dinitrile is contacted with sulfuric acid at a temperature ranging from about 20° to 35° C. and a hydrolysis product is recovered from the reaction mixture. In this process, however, the product seems to be composed of a considerably low level of the isoindolenine (IV) as found from the nitrogen content of 15.97% described in Example 1 of the specification of the said patent. The present inventors have found that the product in such process is a mixture of the isoindolenine (IV) and 1,4-diaminoanthraquinone-2,3-dicarboximide, presumably in a proportion of 1:1, and that, even when the reaction product of 1,4-diaminoanthraquinone-2,3-dinitrile and sulfuric acid is worked up by pouring onto ice and water, filtering with suction and washing with water until the filtrate becomes neutral, the precipitate includes trace of the acid which deleteriously affects to the purity of the isoindolenine (IV), namely, which may convert the isoindolenine (IV) to the dicarboximide during the drying procedure. The inventors have also found that such trace of the acid can be removed by once treating the precipitate with an aqueous dilute alkaline solution, so that the isoindolenine (IV) substantially free from the dicarboximide can be produced.

As mentioned hereinbefore, if the material isoindolenine contains the dicarboximide compound, the product dyestuffs inevitably contains the corresponding dicarboximide dyestuffs which affect deleteriously to the color shade and dyeability.

In carrying out the first process, ordinarily, 1,4-diaminoanthraquinone-2,3-dinitrile is contacted with a fuming sulfuric acid containing 0% to 5% preferably 0.5% to 1%, of $SO_3$ at a temperature of 20° to 30° C. If a sulfuric acid having lower concentration than 100% is used, the hydrolysis reaction is incomplete. If a fuming sulfuric acid containing more than 5% of $SO_3$ is used, the hydrolysis product tends to contain sulfon of the isoindolenine (IV) which is converted to the undesirable dicarboximide compound during the drying procedure. The reaction mixture is agitated for several hours, for example, for 2 to 10 hours, and then poured onto ice and water, preferably dropwise, keeping the temperature at as low as possible, for example at lower than 5° C. The resulting precipitate is then separated from the solution, for example, by filtration, and washed with cold water. The precipitate is treated with an aqueous dilute alkaline solution, such as aqueous sodium hydroxide, potassium hydroxide, sodium carbonate, potassium carbonate, sodium bicarbonate, potassium bicarbonate and the like solution, to neutralize the trace acid contained in the precipitate. The precipitate is again separated and dried at not so high temperature. The resulting hydrolysis product is essentially composed of the isoindolenine (IV).

In carrying out the second process according to the present invention, the isoindolenine (IV) is contacted with an alkylating agent having the general formula of $R^1$—X, wherein $R^1$ and X have the same meanings as identified above.

The alkylating agent employed for the production of the present dyestuffs can be exemplified as follows: n-butyl, isobutyl, sec.-butyl, cyclohexyl, benzyl, methoxyethyl, ethoxyethyl, phenoxyethyl, phenylethyl, benzyloxyethyl, β-hydroxyethyl, 2-propenyl, 2-methyl-2-propenyl, and furfuryl esters of p-toluenesulfonic and benzenesulfonic acids, and their chlorides and bromides. Other saturated and unsaturated alkyl, alkoxyalkyl, cycloalkyl, aryloxyalkyl, aralkyl, aralkyloxyalkyl, and hydroxyalkyl esters of aromatic and aliphatic sulfonic acids and their halides may similarly be used. The amount of the alkylating agent is more than theoretical amount, preferably more than 1.5 times.

The reaction of the isoindolenine (IV) with the alkylating agent is effected in a basic solvent or in a mixture thereof with a neutral solvent, preferably in the presence of an acid-binding agent, such as weakly alkaline alkali metal compounds and alkali-earth metal compounds, at a temperature of 50° to 150° C., preferably 70° to 120° C.

As examples of the neutral solvent, benzene, toluene, xylene, monochlorobenzene, dichlorobenzene, nitrobenzene, dioxan, and various alcohols may be referred to. As examples of the basic solvent, single or mixed tertiary amine, such as pyridine, picoline, dimethylaniline, diethylaniline, and triethylamine or a mixture of dimethyl sulfoxide with dimethylaniline, diethylaniline, trimethylamine, pyridine or picoline, may be referred to. The sulfonic acid ester as the alkylating agent may also serve as the solvent if employed in excess.

The acid-binding agent may be any of weakly alkaline compound, the examples of which involve sodium and potassium bicarbonates; sodium, potassium, magnesium and calcium carbonates; magnesium and calcium oxides; sodium and potassium acetates; disodium hydrogenphosphate; and mixtures thereof.

Some of the dyestuffs produced according to the present invention are novel, which have excellent dyeabilities to various synthetic fibers, especially polyester, acetylcellculose, polyacrylonitrile, polyamides, polyurethane fibers, and the like, in brilliant greenish blue shade, with high fastnesses to light, sublimation, and washings. Even the dyestuffs produced according to the present invention, which have apparently the same chemical structure as those already known, are much superior in the color shades and dyeabilities to those already known.

The invention is more minutely described with reference to the working examples, which are, however, set forth merely by way of illustration and not by way of limitation.

Example 1

To 150 g. of a fuming sulfuric acid containing 0.5% of $SO_3$, 10 g. of 1,4-diaminoanthraquinone-2,3-dinitrile is added portionwise at a temperature of 20° to 30° C.

The reaction mixture is stirred for 3 hours at the same temperature. The precipitate formed upon pouring the reaction mixture into 1,500 g. of ice and water is collected by filtration and washed with cold water.

The collected precipitate is added to 300 g. of ice and water to form suspension. A dilute aqueous sodium hydroxide is added dropwise thereto until the pH is adjusted to 7.0.

Thereafter the precipitate is again collected by filtration, washed with cold water and dried in vacuo.

Thus 9.9 g. of 1-hydroxy-3-imino-4,7-diamino-5,6-phthaloylisoindolenine is obtained.

Elementary analysis is as follows.
Calc.: N, 18.28%. Found: N, 18.05%.

Example 2

A mixture of 3.1 g. of 1-hydroxy-3-imino-4,7-diamino-5,6-phthaloylisoindolenine, 30 g. of monochlorobenzene, 1 cc. of pyridine, 3.5 g. of sodium carbonate and 8 g. of β-methoxyethyl p-toluenesulfonate is stirred for 7 hours at 120° C. and then cooled.

After dropwise addition of 10 g. of methanol for dilution, the formed precipitate is collected by filtration, washed with methanol and, after that, with water and dried.

The chemical structure of the thus obtained novel dyestuff, which is suitably employed for dyeing polyesters in greenish blue shade with high fastnesses is as follows:

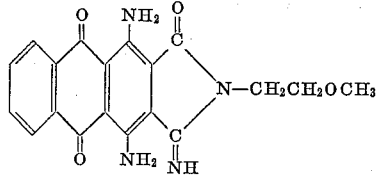

M.P. 222° to 223° C.

Elementary analysis is as follows.
Calc. (as $C_{19}H_{16}O_4N_4$): N, 15.4; C, 62.6%. Found: N, 15.0; C, 62.1%.

Example 3

A mixture of 3.1 g. of 1-hydroxy-3-imino-4,7-diamino-5,6-phthaloylisoindolenine, 20 g. of ethylene glycol mono methyl ether, 3 g. of sodium carbonate and β-ethoxyethyl p-toluenesulfonate is stirred for 6 hours at 120° to 124° C. and then cooled.

The formed precipitate is collected by filtration, washed with methanol and thereafter with water and dried.

The chemical structure of the thus obtained novel dyestuff, which is suitably employed for dyeing polyesters in greenish blue shade with high fastnesses, is as follows:

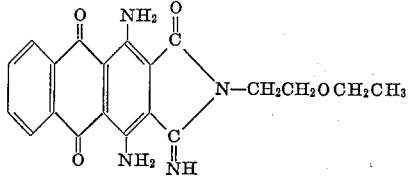

M.P. 190° to 193° C.

Even when β-ethoxyethyl butanesulfonate instead of the β-ethoxyethyl p-toluenesulfonate is used, with otherwise the same conditions, the result is same.

Example 4

A mixture of 6.5 g. of 1-hydroxy-3-imino-4,7-diamino-5,6-phthaloylisoindolenine, 15 g. of n-butyl p-toluenesulfonate, 60 g. of monochlorobenzene, 2 cc. of pyridine and 5 g. of sodium carbonate is stirred for 6 hours at 120° C. and then cooled. The formed precipitate is collected by filtration, washed with methanol and thereafter with water and dried.

The chemical structure of the thus obtained dyestuff, which is suitably employed for dyeing polyesters in blue shade with high fastnesses, is as follows:

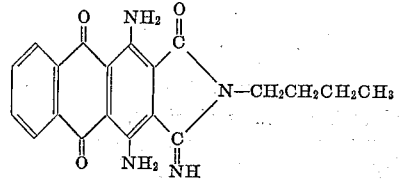

M.P. 232° to 234° C.

Elementary analysis is as follows:
Calc. (as $C_{20}H_{18}O_3N_4$): N, 15.5; C, 66.3%. Found: N, 15.1; C, 66.8%.

This compound is soluble in concentrated sulfuric acid in light-brown color, which is turned instantly to green color by addition of paraformaldehyde. It is soluble in concentrated hydrochloric acid in red color and in formic acid in blue.

And it wholly differs in the chemical structure from the compound obtained by mixing 1-hydroxy-3-imino-4,7-diamino-5,6-phthaloylisoindolenine with n-butylamine. Even when butyl iodide or butyl bromide instead of n-butyl p-toluenesulfonate is used with otherwise the same conditions, the result is same.

Example 5

By using 2-ethylhexyl p-toluenesulfonate under such conditions as described in Example 4, novel dyestuff having the following structure, M.P. 143° to 145° C., is obtained:

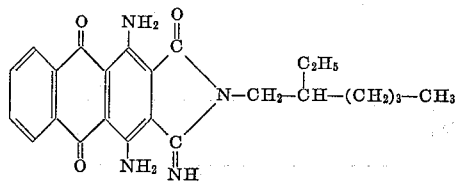

Example 6

Three point zero grams of 1-hydroxy-3-imino-4,7-diamino-5,6-phthaloylisoindolenine, 15 g. of nitrobenzene, 10 g. of allyl chloride, 5 g. of sodium bicarbonate and 2 g. of triethylamine are charged in an autoclave and the mixture is stirred at 70° to 75° C. till the isoindolenine is used up.

Stirring for about 6 hours is necessary. When the reaction is over, the precipitate formed upon cooling the reaction mixture is collected by filtration, washed with methanol, whereby the filtrate color turns to sky blue, washed with hot water and dried. Thus a novel dyestuff having the formula:

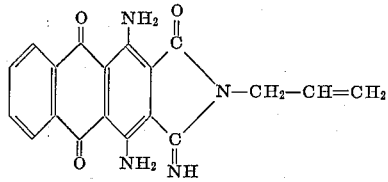

M.P. 220° to 223° C., is obtained in high yield.

Elementary analysis is as follows:
Calc. (as $C_{19}H_{14}O_3N_4$): N, 16.18%. Found: N, 16.0%.

The obtained dyestuff is suitably employed for dyeing polyesters in brilliant greenish blue shade with excellent dyeability and high fastnesses.

Example 7

According to the procedure similar to that in Example 6 with the exception of using 5 g. of β-methallyl chloride instead of the allyl chloride and the conditions at 85° C. for 4 hours, a novel dyestuff having the formula:

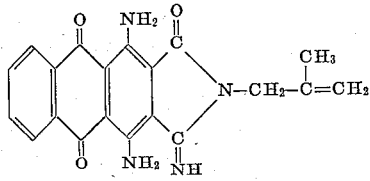

M.P. 211° to 213° C., is obtained.

Elementary analysis is as follows.

Calc. (as $C_{20}H_{16}O_3N_4$): N, 15.55%. Found: N, 15.34%.

The obtained dyestuff is suitably employed for dyeing polyesters in brilliant greenish blue shade with excellent dyeability and high fastnesses.

*Example 8*

According to the procedure similar to that in Example 6 with the exception of using 3.7 g. of benzyl chloride instead of the allyl chloride and the conditions at 100° to 110° C. for 5 hours, a novel dyestuff having the formula,

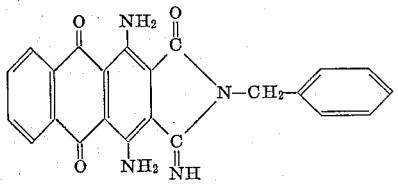

M.P. 278° to 280° C., is obtained.

By using following alkylating agents according to the procedure similar to that in the preceding examples, following dyestuffs are obtained.

What we claim is:

1. A process for producing an anthraquinone dyestuff compound of the formula,

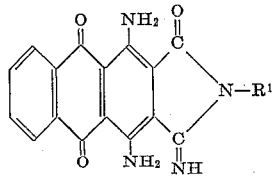

wherein $R^1$ is selected from the group consisting of saturated and unsaturated alkyl, alkoxyalkyl, cycloalkyl, aryloxyalkyl, aralkyl, aralkyloxyalkyl, hydroxyalkyl and furfuryl radicals, having 2 to 12 carbon atoms, which process comprises reacting 1-hydroxy-3-imino-4,7-diamino-5,6-phthaloylisoindolenine or its tautometer, 1-oxo-3-imino-4,7-diamino-5,6-phthaloylisoindoline, with more than theoretical amount of an alkylating agent having the general formula of $R^1$—X, wherein X is selected from the group consisting of halogen atoms and $R^2$—$SO_2$—O— radicals, $R^1$ having the same meanings as identified above and $R^2$ being phenyl or a lower alkyl-substituted phenyl at a temperature ranging from 50° to 150° C. in the presence of at least an acid-binding agent and at least a member of a basic solvent and a neutral solvent, the acid binding agent being selected from the group consisting of sodium and potassium bicarbonates; sodium, potassium, magnesium and calcium carbonates; magnesium and calcium oxides; sodium and potassium acetates, and disodium hydrogen-phosphate, the basic solvent being at least a member selected from the group consisting of pyridine, picoline, dimethylaniline, diethylaniline and triethylamine and the neutral solvent being a member selected from the group consisting of benzene, toluene, xylene, monochlorobenzene, dichlorobenzene, nitroben-

| Example No. | Alkylating agents | $R^1$ | Color (in pyridine) |
|---|---|---|---|
| 9 | p-Toluenesulfonic acid isobutyl ester | —$CH_2CH(CH_3)_2$ (Novel) | Greenish blue. |
| 10 | p-Toluenesulfonic acid phenoxyethyl ester | —$CH_2CH_2$—O—⟨phenyl⟩ (Novel) | Do. |
| 11 | p-Toluenesulfonic acid benzyloxyethyl ester. | —$CH_2CH_2$—O—$CH_2$—⟨phenyl⟩ (Novel) | Do. |
| 12 | p-Toluenesulfonic acid phenylethyl ester | —$CH_2CH_2$—⟨phenyl⟩ (Novel) | Do. |
| 13 | p-Toluenesulfonic acid β-hydroxyethyl ester. | —$CH_2CH_2OH$ (Known) | Do. |
| 14 | p-Toluenesulfonic acid furfuryl ester | —$CH_2$—⟨furyl⟩ (Novel) | Do. |
| 15 | p-Toluenesulfonic acid cyclohexyl ester | —$C_6H_{11}$ (Novel) | Do. |
| 16 | Benzenesulfonic acid sec.-butyl ester | —CH—$CH_2$—$CH_3$ \| $CH_3$ (Novel) | Do. | zene, dioxane and ethylene glycol monoethyl ether and dimethyl sulfoxide.

2. A process as defined in claim 1, wherein the said alkylating agent is a member selected from the group consisting of β-methoxyethyl p-toluenesulfonate, β-ethoxyethyl p-toluenesulfonate, n-butyl p-toluenesulfonate, 2-ethylhexyl p-toluenesulfonate, allyl chloride, β-methallyl chloride, benzylchloride, p-toluenesulfonic acid isobutyl ester, p-toluenesulfonic acid phenoxyethyl ester, p-toluenesulfonic acid benzyloxyethyl ester, p-toluenesulfonic acid phenylethyl ester, p-toluenesulfonic acid β-hydroxyethyl ester, p-toluenesulfonic acid furfuryl ester, p-toluenesulfonic acid cyclohexyl ester and benzenesulfonic acid sec.-butyl ester.

References Cited
UNITED STATES PATENTS
3,151,160  9/1964  Spivack _____ 260—326
3,246,009  4/1966  Loev _____ 260—326

OTHER REFERENCES
Ing et al.: Jour. Chem. Soc., 1926, pages 2348–2351.

ALEX MAZEL, *Primary Examiner.*

MARY U. O'BRIEN, J. A. NARCAVAGE,
*Assistant Examiners.*